(12) United States Patent
Teksler

(10) Patent No.: US 10,106,222 B1
(45) Date of Patent: Oct. 23, 2018

(54) PEDAL APPARATUS WITH ACTUATOR CONFIGURED TO APPLY VARIABLE PRESSURES

(71) Applicant: Jakob Kai Teksler, Los Altos, CA (US)

(72) Inventor: Jakob Kai Teksler, Los Altos, CA (US)

( * ) Notice: Subject to any disclaimer, the term of this patent is extended or adjusted under 35 U.S.C. 154(b) by 0 days.

(21) Appl. No.: 15/788,639

(22) Filed: Oct. 19, 2017

Related U.S. Application Data

(63) Continuation of application No. 15/615,407, filed on Jun. 6, 2017, now abandoned.

(51) Int. Cl.
| | | |
|---|---|---|
| *B62M 3/08* | (2006.01) |
| *B62K 23/08* | (2006.01) |
| *B62M 5/00* | (2006.01) |
| *G08B 1/02* | (2006.01) |
| *G08C 21/00* | (2006.01) |
| *B62M 25/08* | (2006.01) |
| *F16D 125/40* | (2012.01) |

(52) U.S. Cl.
CPC ............. *B62M 3/086* (2013.01); *B62K 23/08* (2013.01); *B62M 5/00* (2013.01); *B62M 25/08* (2013.01); *G08B 1/02* (2013.01); *G08C 21/00* (2013.01); *F16D 2125/40* (2013.01)

(58) Field of Classification Search
CPC ........ B62M 3/086; B62M 5/00; B62M 25/00; B62K 23/08; G08B 1/02; F16D 2125/40; G08C 21/00
USPC ............................... 280/233; 74/594.4, 594.6
See application file for complete search history.

(56) References Cited

U.S. PATENT DOCUMENTS

| | | | | |
|---|---|---|---|---|
| 5,557,985 A * | 9/1996 | Nagano | ................. | B62M 3/086 74/594.4 |
| 6,014,914 A * | 1/2000 | Ueda | ..................... | B62M 3/086 74/594.4 |
| 6,164,158 A * | 12/2000 | Landru | .................. | B62M 3/086 74/594.6 |
| 6,425,304 B1 * | 7/2002 | Bryne | .................... | B62M 3/086 36/131 |
| 6,446,529 B1 * | 9/2002 | Tanaka | .................. | B62M 3/086 74/594.6 |
| 2011/0087446 A1 * | 4/2011 | Redmond | ............. | A61B 5/221 702/44 |
| 2011/0219911 A1 * | 9/2011 | Zoumaras | ................ | B62J 25/00 74/594.6 |
| 2012/0125147 A1 * | 5/2012 | Inoue | ..................... | B62M 3/086 74/594.6 |
| 2012/0125148 A1 * | 5/2012 | Inoue | ..................... | B62M 3/086 74/594.6 |
| 2014/0224062 A1 * | 8/2014 | Vigliotti | ................ | B62M 3/086 74/594.6 |

* cited by examiner

*Primary Examiner* — Jacob D Knutson
(74) *Attorney, Agent, or Firm* — Fox Rothchild LLP; Christopher L. E. Hines

(57) ABSTRACT

In one example aspect, a pedal apparatus is disclosed. The pedal apparatus may include a first portion. The first portion may be configured to secure a second portion that may be attached to a footwear. The first portion may be different than the second portion. The pedal apparatus may also include at least one actuator that may be configured to apply one or more variable pressures on the second portion, which may be based one or more movements of the first portion.

14 Claims, 14 Drawing Sheets

US 10,106,222 B1

PEDAL APPARATUS WITH ACTUATOR CONFIGURED TO APPLY VARIABLE PRESSURES

BACKGROUND

Various designs for bicycle pedals exist to ensure the feet of a rider stay intact with the pedal. For example, some designs may include toe straps that may better allow the shoe of a rider to attach to the pedal. In another example, a pedal design may allow a shoe or cleat that is attached to the bottom of a shoe to be engaged by the pedal. Such designs may allow the motion of the shoe, moving up and down, to be more effectively translated to the pedal while keeping the feet of the rider in contact with the pedal.

SUMMARY

Within examples, apparatuses, systems, and methods are disclosed that may improve the control of vehicles such as bicycles.

In one example aspect, a pedal apparatus is disclosed. The pedal apparatus may include a first portion. The first portion may be configured to secure a second portion that may be attached to a footwear. The first portion may be different than the second portion. The pedal apparatus may also include at least one actuator that may be configured to apply one or more variable pressures on the second portion, which may be based one or more movements of the first portion.

In another example aspect, a system is disclosed. The system may include a first portion. The first portion may be configured to secure a second portion that may be attached to a footwear. The first portion may be different than the second portion. The system may also include at least one actuator that may be configured to apply one or more variable pressures on the second portion, which may be based one or more movements of the first portion. In yet another example aspect, a system is disclosed. The system includes a petal apparatus comprising a first portion configured to secure a second portion. The second portion may be attached to a footwear. The first portion is different than the second portion. The system may further include at least one computer processor and at least one memory containing instructions which, when executed, cause the computer processor to detect one or more movements of the first portion and based on the one or more movements, apply one or more variable pressures on the second portion.

DETAILED DESCRIPTION

Figure 1A:
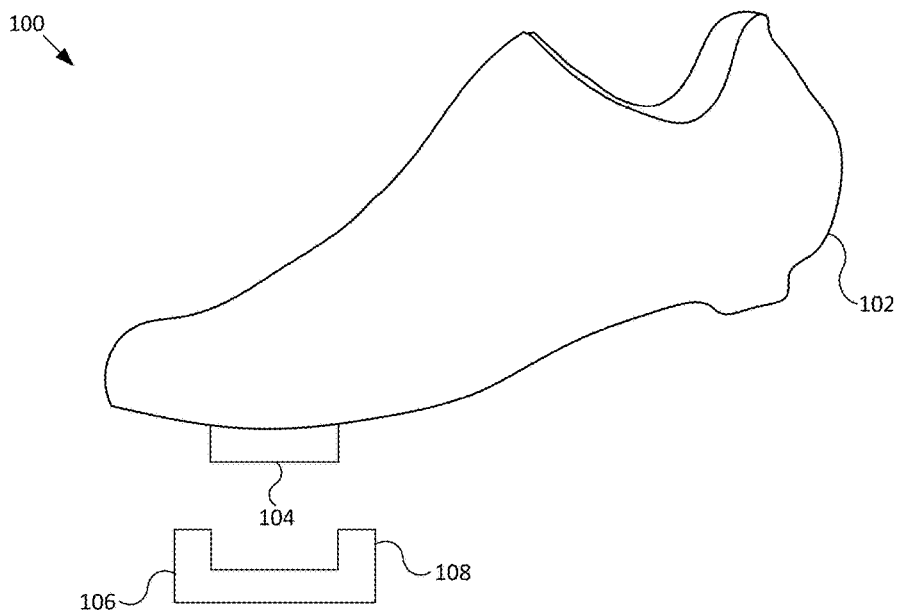
FIGS. 1A and 1B illustrates an example pedal apparatus.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Many human-powered vehicles, such as bicycles, include pedals upon which a rider may place her feet. Specifically considering a bicycle, the bicycle may be propelled in a forward direction by pushing the pedals in an interchangeable manner. However, various challenges may arise as a rider pushes on the pedals. For example, in some instances, the feet of the rider may slip off the pedals, potentially causing an accident and/or injury. To remedy this potential risk, the rider may constantly attempt to adjust her feet in attempt to prevent her feet from slipping off of the pedals. In another example, the rider may utilize riding shoes that may include a clip designed to lock into the pedals of the bicycle. With the shoes locking into the pedals, the rider may able to push on the pedals and also pull the pedals in an interchangeable manner to better propel the bicycle in a forward direction. Various other circumstances may give rise to difficulties and/or inconveniences while riding a bicycle. Embodiments described herein may address the need for technological improvements in bicycles and similar human-powered vehicles Considering the scenario in which the rider utilizes a pair of cycling shoes, as stated above, the shoes may lock into (or to) the pedals. As such, the rider is able to push on the pedals and pull the pedals in an interchangeable manner to propel the bicycle in a forward direction. However, to remove the shoes from the pedals, the rider may be required to manually unlock, e.g., de-clip, the clips from the respective pedals. As such, various challenges may arise as a rider pushes and pulls on the pedals.

In one scenario, the rider may encounter difficulties keeping the clips locked into their respective pedals when biking uphill and pulling on the pedals. For example, the rider may encounter difficulty when biking at faster speeds with larger amounts of pressure or torque exerted on the pedals. In such an example, the cycling shoes may inadvertently unlock from the pedals and thus the rider may consequently lose control of the bicycle. In another example, the rider may encounter difficulties unlocking, e.g., de-clipping, the shoes from the pedals when the rider is coming to a stop. In a further example, the rider may have to stop suddenly and may not have enough time to unlock the shoes from the pedals. In such scenarios, as well as others, the rider may fall to the ground, possibly causing injuries to the rider.

The pedal apparatus described herein may resolve some or all of the above-referenced problems. For example, the pedal apparatus may include an actuator that may be configured to apply variable pressures on a footwear block attached to a cycling shoe of the rider. Accordingly, the actuator may increase pressures on the footwear block as the rider is biking uphill, biking at faster speeds, and/or biking with the larger amounts of torque exerted on the pedals. The increased pressures on the footwear block may keep the footwear block attached to the respective pedal of the bicycle. Conversely, the actuator may decrease pressure on the footwear block as the bicycle slows down. In some examples, the increase and decrease of pressures by the actuator may occur simultaneously. Further, the actuator may remove the pressure to unlock the shoes of the rider from the pedals as the bicycle comes to a stop, such as, for example, a scenario in which the rider may have to stop suddenly. In such a scenario, the variable pressures on the footwear block may prevent the rider from falling and may avert injuries.

Figure 1B:
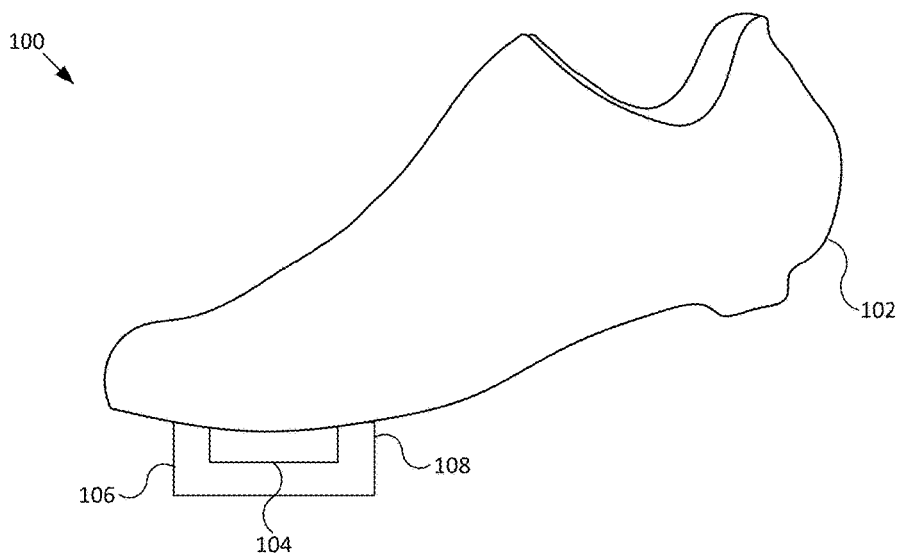

Referring now to the figures, FIGS. 1A and 1B illustrate a pedal apparatus 100, according to an example embodiment. Pedal apparatus 100 may include a footwear block 104 and a platform 106. As shown, in some examples the footwear block may be connected to footwear 102. In other examples, the footwear block 104 may not be connected to footwear 102. FIG. 1A illustrates the footwear block 104 removed from the platform 106 and FIG. 1B illustrates the footwear block 104 secured by the platform 106. The platform 106 may be configured to operably secure footwear block 104 to the platform 106. Both the footwear block 104 and platform 106 may be comprised of materials including chromoly, plastic, titanium, and carbon fiber to name a few. Other materials may be used.

The pedal apparatus 100 may also include an actuator 108 (e.g., a servo actuator) that may be configured to apply one or more variable pressures on footwear block 104. In some examples, the actuator 108 may be operably connected to platform 106, and in others the actuator 108 may be part of platform 106. The movements may be based on one or more movements of the platform 106. The movements may include a velocity, an angular velocity, and/or an acceleration of the platform 106, among other possibilities. The movements may be associated with rotations of the platform 106, such as the roll, pitch, and/or yaw of the platform 106.

Figure 2A:
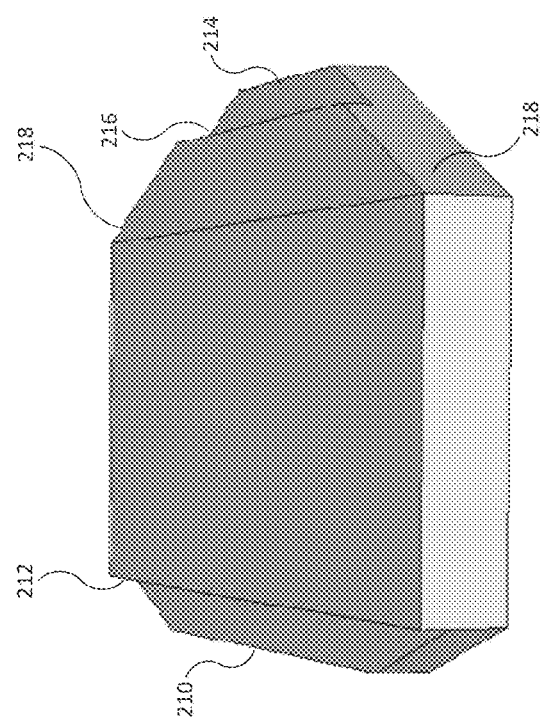
FIG. 2A illustrates an example footwear block.

FIG. 2A illustrates an enlarged view of footwear block 204 (104 of FIGS. 1A and 1B), according to an example embodiment. As shown, footwear block 204 may include a front portion 210 with a front groove 212. Footwear block 204 may also include a back portion 214 and a back groove 216. Footwear block 204 may further include curvatures 218. Similar to footwear block 204 (104 of FIGS. 1A and 1B) groves 216 may be comprised of materials including chromoly, plastic, titanium, and carbon fiber to name a few. Other materials may be used.

Figure 2B:
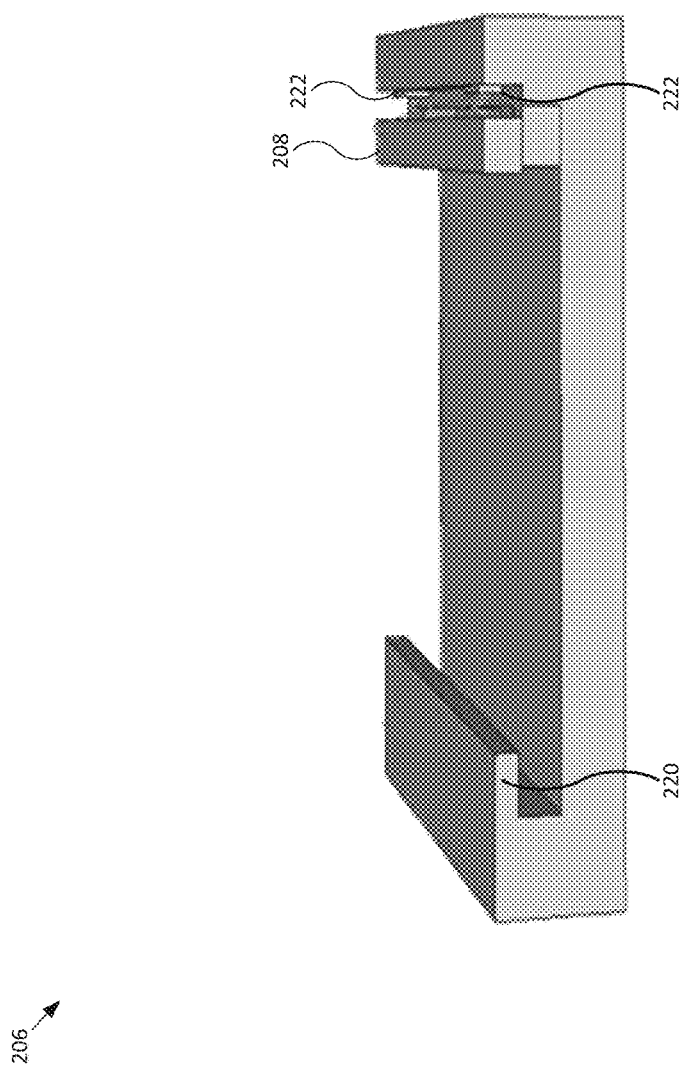
FIG. 2B illustrates an example platform.

FIG. 2B illustrates an enlarged view of platform 206 (106 of FIGS. 1A and 1B), according to an example embodiment. As shown, platform 206 may include an actuator 208 and springs 222. The actuator 208 may be configured to apply the one or more variable pressures on the footwear block 204 based on the operation of springs 222. For example, actuator 208 may be configured to apply variable pressures down on the footwear block 204, among other possibilities. In some examples, footwear block 204 may be secured with the clamp 220. For example, It should be noted that actuator 208 may be positioned on various of portions of the platform 206, such as the front portion, side portions, back portions, or top portions.

Figure 2C:
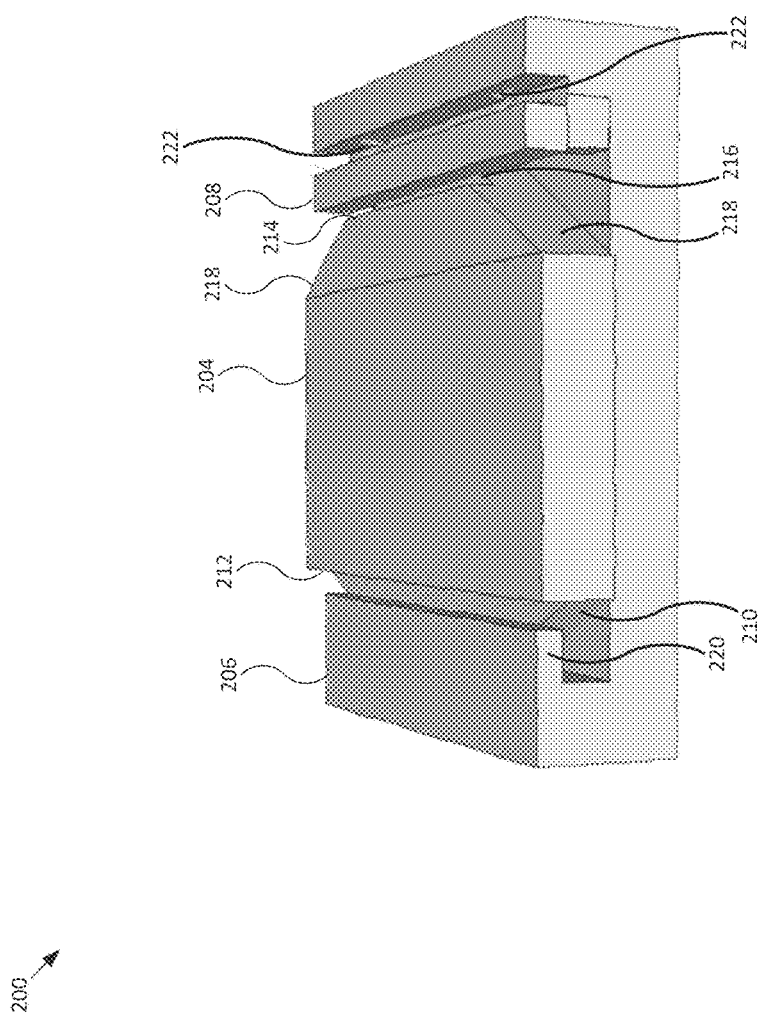
FIG. 2C illustrates another example pedal apparatus.

FIG. 2C illustrates an enlarged view of pedal apparatus 200, according to an example embodiment. The pedal apparatus 200 may include platform 206, which may be the same as or similar to the platform 106 described with respect to FIGS. 1A and 1B, and may be configured to operably secure footwear block 204. Pedal apparatus 200 may also include actuator 208 that may be configured to apply the one or more variable pressures on the footwear block 204 based on one or more movements of the platform 200.

In example embodiments, footwear block 204 includes a front portion 210 and a back portion 214. The front portion 210 may be substantially (or insubstantially) positioned under the clamp 220 to possibly allow the front portion to operably secure footwear block 204 to platform 206. Substantially positioned may include the majority of front portion 210 to be positioned under clamp 220, and alternatively, insubstantially positioned may include a minority of front portion being positioned under clamp 220. The actuator 208 may be configured to apply the one or more variable pressures on the back portion 216 of footwear block 204 to possibly cause footwear block 204 to operably lock the platform 206 based on the one or more movements of platform 206. The one or more movements of the platform 206 may include a movement based on pulling the footwear block 204 or based on pushing the footwear block 204.

In another example, front portion 210 of footwear block 204 may include front groove 212 that may substantially (or insubstantially) fit under clamp 220 of platform 206. The back portion 214 of footwear block 204 may also include back groove 216 that may substantially (or insubstantially) fit under the actuator 208. Substantially fit may include a majority of front groove 212 or back groove 214 to be positioned under clamp 220, and alternatively, insubstantially fit may include a minority of groove 212 or back groove 214 being positioned under clamp 220. As such, the footwear block 204 may be operatively locked in the platform 206. Actuator 208 may be configured to apply the one or more variable pressures on the back groove 216 to cause the front groove 212 to lock with the clamp 220.

In a further example, actuator 208 may include the one or more springs 222 that may be configured to apply one or more variable pressures on the footwear block 204 to operatively lock the footwear block 204 with the platform 206. Notably, the one or more springs 222 may be configured to remove the one or more variable pressures from the footwear block 204 based on one or more tilts and the one or more movements of the platform 206. As noted, the footwear block 204 may include one or more curvatures 218 on the back portion 214 of the footwear block 204. As such, footwear block 204 may be configured to release from the platform 206 based on the one or more curvatures 218 and the one or more springs 222. For example, the release may include a mechanical release from the platform 206 to give the rider an option to release the footwear block 204 from the platform 206. In another example, the footwear block 204 may take the place of the footwear block 104 on the footwear 102 and the platform 206 takes the place of the platform 106. In such a scenario, the rider may be able to push the footwear 102 forward and twist to either side to release the footwear block 204 from the platform 206 based on the one or more curvatures 218 and the one or more springs 222.

In another example, a computer (e.g., a controller or processor) may be included or incorporated with pedal apparatus 200 as further described herein. For example, consider the scenario where the footwear block 204 takes the place of the footwear block 104 on the footwear 102 and the platform 206 takes the place of the platform 106. In such example, the computer may be incorporated with the footwear 102, possibly as a wearable device and/or system, e.g., a system-on-chip (SOC), incorporated and/or embedded in the footwear 102. As such, the one or more movements of the footwear block 204 and/or the platform 206 may be detected by the computer associated with the footwear 102, where the footwear 102 is attached to the footwear block 204. Further, the computer may control the actuator 208 to apply the one or more variable pressures on the footwear block 204 based on the one or more detected movements. In another example, the computer may detect the one or more movements with a motion sensor, possibly also embedded in the footwear 102. In yet another example, the computer may detect one or more tilts of a bicycle with the pedal apparatus 200. In such instances, the actuator 208 may be configured to remove the one or more variable pressures from the footwear block 204 based on the one or more detected tilts and/or movements. The footwear block 204 may be released from the platform 206 to allow the rider to place her feet on the ground.

As described herein the pedal apparatus 200 may be implemented with a bicycle. Pedal apparatus 200 may be implemented with various other types of mobile structures as well. For example, the pedal apparatus 200 may be incorporated with skis, possibly where the platform 206 may be attached to a left ski and an additional platform that also takes the form of platform 206 may be attached to the right ski. Further, the pedal apparatus 200 may be incorporated with boards, such as snowboards to provide riders with the convenience of locking and/or unlocking footwear, e.g., snowboarding boots, based on the movements of the snowboard. In a further example, the pedal apparatus 200 may be incorporated with an interchangeable sole of a shoe, such as cleats to provide users with protection against planting and twisting injuries, e.g., anterior cruciate ligament tears, in which the foot and/or leg of a user gets caught on the playing surface. Other implementations are possible.

Figure 3A:
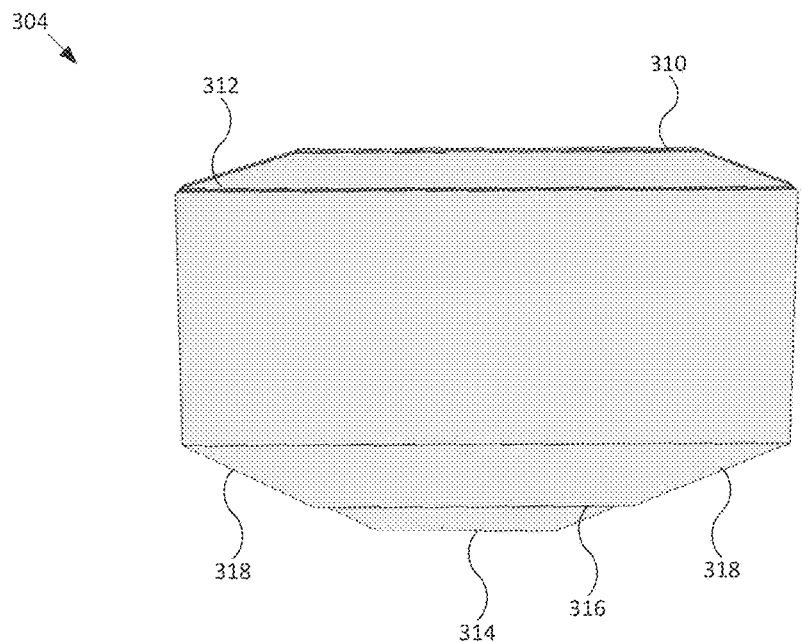
FIGS. 3A and 3B illustrate an example footwear block.
Figure 3B:
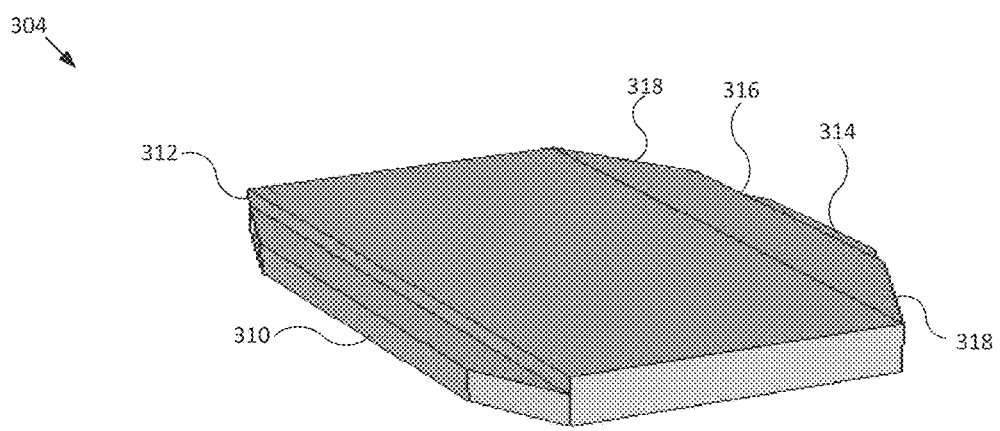

FIGS. 3A and 3B illustrate a footwear block 304 (104 and 204 in FIGS. 1A and B and 2A respectively), according to an example embodiment. As noted, the footwear block 304 may take the form of the footwear block 204 and may take the place of the footwear block 104 on the footwear 102 described above. In one example, the footwear block 304 may include a front portion 310 with a front groove 312. The footwear block 304 may also include a back portion 314 with a back groove 316 and one or more curvatures 318. Notably, the front portion 310, the front groove 312, the back portion 314, the back groove 316, and the curvatures 318 may take the form of the front portion 210, the front groove 212, the back portion 214, the back groove 216, and the curvatures 218 described above.

Figure 3C:
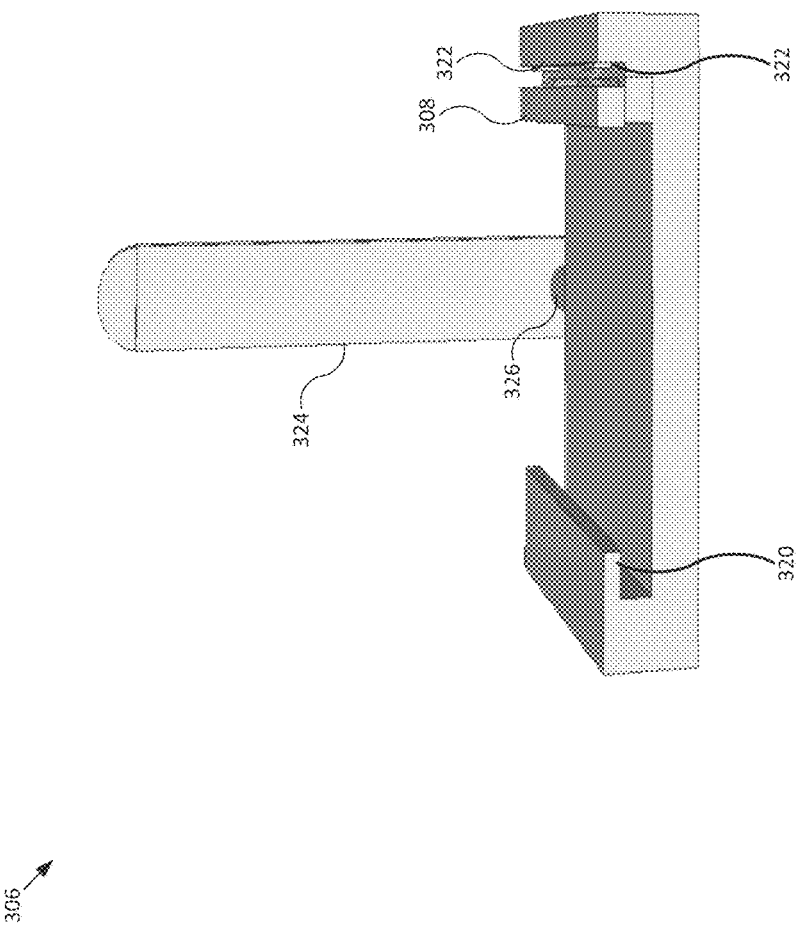
FIGS. 3C and 3D illustrate an example platform.
Figure 3D:
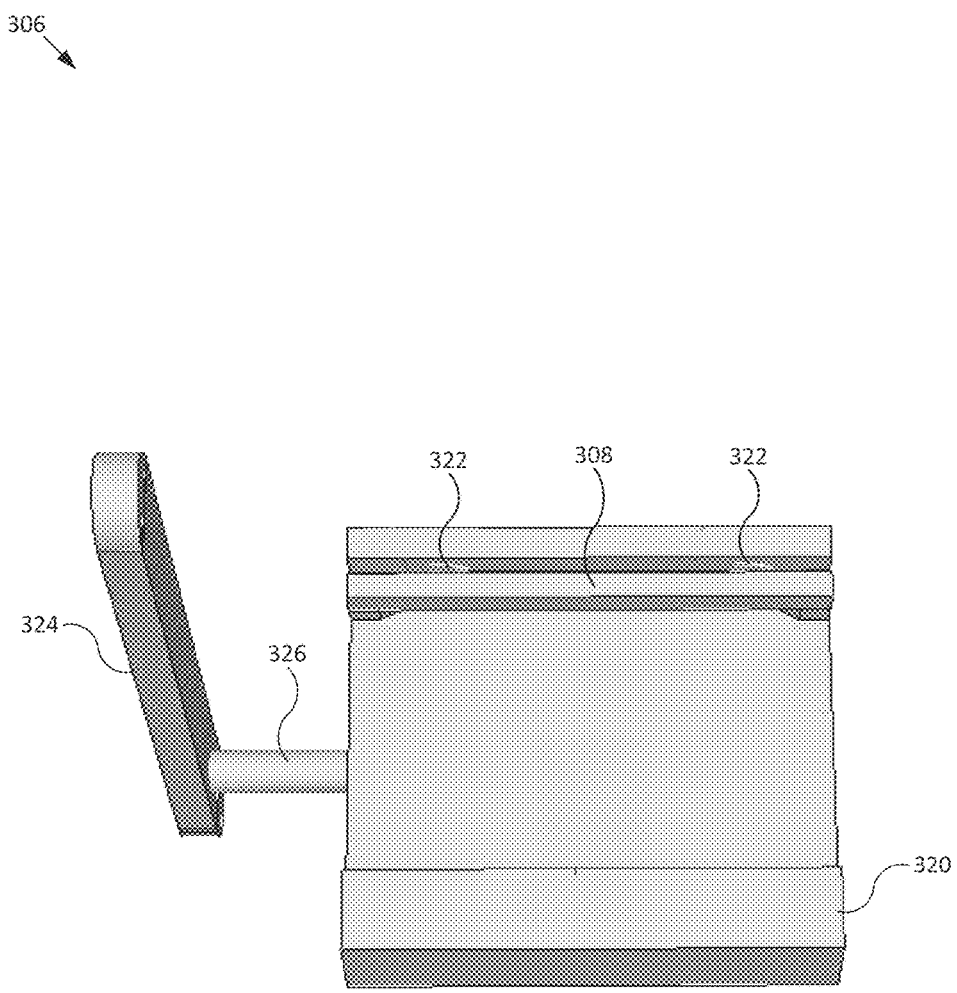

FIGS. 3C and 3D illustrate a top-left view of the platform 306 as may be operable with a crank arm 324, according to an example embodiment. The platform 306 may take the form of the platform 206 and/or the platform 106 described above. In one example, the platform 306 may include an actuator 308 and springs 322. The actuator 308 may be configured to apply the one or more variable pressures on the footwear block 304 based on the springs 322. As such, the footwear block 304 may be secured with the clamp 320. The platform 306 further includes a crank arm 324 and a crank pin 326. The crank arm 324 may be attached to a bicycle or other vehicle and may propel the bicycle in a forward direction.

Figure 3E:
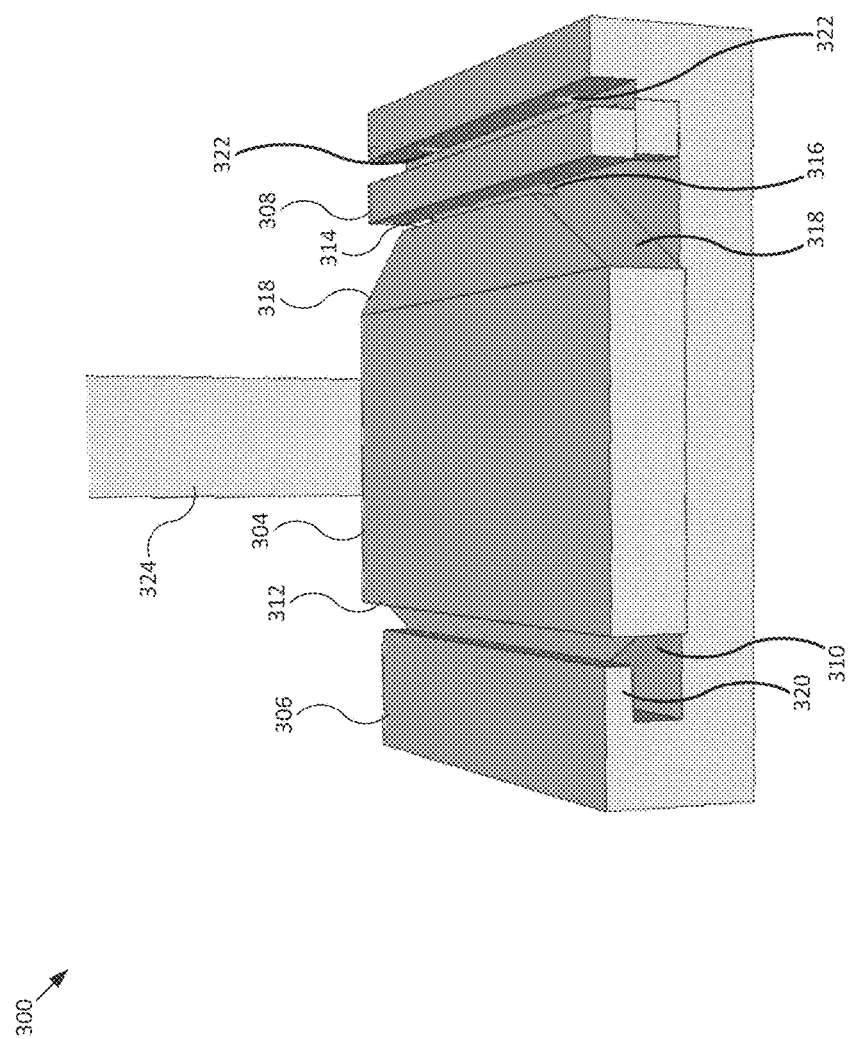
FIGS. 3E and 3F further illustrate an example pedal apparatus.
Figure 3F:
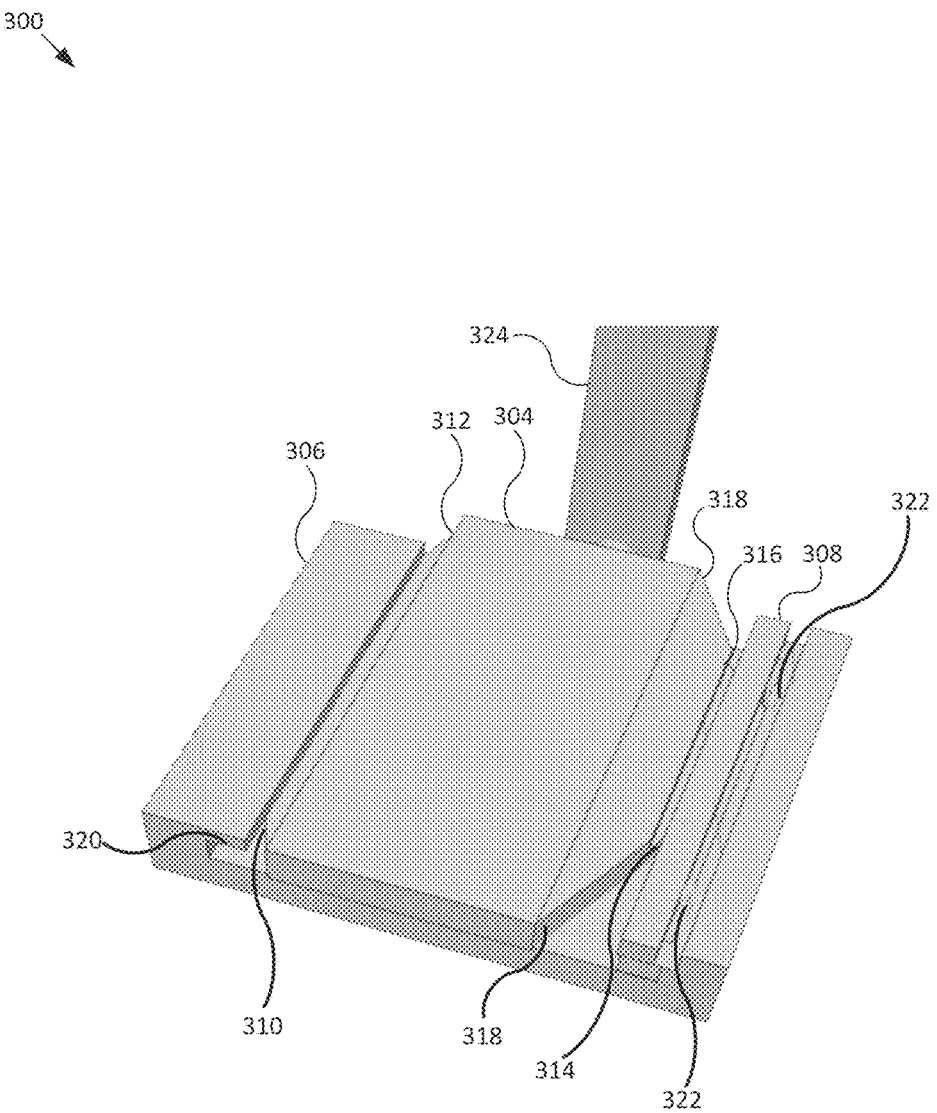

FIGS. 3E and 3F illustrate an enlarged view of pedal apparatus 300, according to exemplary embodiments. The pedal apparatus 300 may include platform 306 that is configured to substantially secure footwear block 304. Pedal apparatus 300 may also include actuator 308 configured to apply the one or more variable pressures on footwear block 304 based on one or more movements of platform 300.

In one example, the footwear block 304 includes front portion 310 and back portion 314. The front portion 310 may substantially fit under clamp 320 of platform 306 to substantially secure footwear block 304 to platform 306. The actuator 308 may be configured to apply one or more variable pressures on the back portion 316 of footwear block 304 to cause footwear block 304 to substantially lock with platform 306 and/or substantially into platform 306 based on the one or more movements of the platform 306. The one or more movements of platform 306 may include a movement from pulling the footwear block 304, such as where the footwear block 304 is attached to the footwear 102 described above. The one or more movements of the platform 306 may also include a movement from pushing footwear block 304. The one or more movements of the platform 306 may include a movement based on a movement of the bicycle using crank arm 324 and the crank pin 326.

In another example, front portion 310 of footwear block 304 may include front groove 312 that may fit under clamp 320 of platform 306. Back portion 314 of footwear block 304 may also include back groove 316 that may substantially fit under actuator 308. As such, the footwear block 304 may be substantially locked in platform 306. The actuator 308 may be configured to apply the one or more variable pressures on the back groove 316 to cause the front groove 312 to lock with the clamp 320.

In another example, actuator 308 may include one or more springs 322 configured to apply one or more variable pressures on footwear block 304 to lock the footwear block 304 with platform 306. Notably, the one or more springs 322 may be configured to remove the one or more variable pressures from the footwear block 304 based on one or more tilts and the one or more movements of the platform 306. Further, the footwear block 304 may include one or more curvatures 318 on the back portion 314 of the footwear block 304. As such, the footwear block 304 may be configured to release from the platform 306 based on the one or more curvatures 318 and the one or more springs 322. For example, the release may be a mechanical release from the platform 306 to give the rider an option to release the footwear block 304 from the platform 306. In one scenario, where the footwear block 304 takes the place of the footwear block 104 on the footwear 102 and the platform 306 takes the place of the platform 106. In such a scenario, the rider may be able to push the footwear 102 forward and twist to either side to release the footwear block 304 from the platform 306 based on the one or more curvatures 318 and the one or more springs 322.

In another example, a bicycle computer, e.g., a controller, may be implemented with the pedal apparatus 300 as further described herein. For example, consider the scenario where the footwear block 304 takes the place of the footwear block 104 on the footwear 102 and the platform 306 takes the place of the platform 106. In such a scenario, the bicycle computer may be incorporated with the footwear 102, possibly as a wearable device and/or system, e.g., a system-on-chip (SOC), incorporated and/or embedded in the footwear 102. As such, the one or more movements of the footwear block 304 and/or the platform 306 may be detected by the bicycle computer associated with footwear 102, where the footwear 102 is attached to the footwear block 304. Further, the computer may control the actuator 308 to apply the one or more variable pressures on the footwear block 304 based on the one or more detected movements.

In another example, the computer may detect the one or more movements with a motion sensor, possibly also embedded in the footwear 102 or the bicycle with the crank arm 324 and the crank pin 326. In yet another example, the bicycle computer may detect one or more tilts of the bicycle. In such instances, the actuator 308 may be configured to remove the one or more variable pressures from the footwear block 304 based on the one or more detected tilts and/or movements. The footwear block 304 may be released from the platform 306 to allow the rider to place her feet on the ground as described above.

Figure 4A:
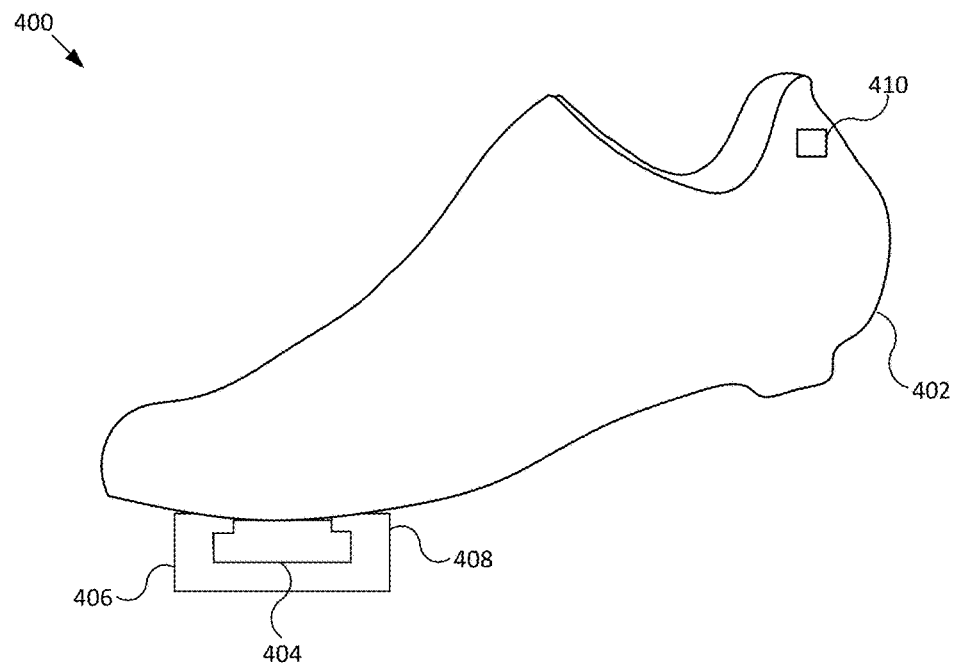
FIG. 4A illustrates yet further illustrates an example pedal apparatus.

FIG. 4A illustrates a pedal apparatus 400, according to an exemplary embodiment. In one example, footwear 402, a footwear block 404, a platform 406, and an actuator 408 may take the form of the footwear 102, the footwear block 104, the platform 106, and the actuator 108, respectively, as described above. In other examples, the footwear block 404, the platform 406, and the actuator 408 may take the form of the footwear block 204, the platform 206, and the actuator 208, respectively, and/or the footwear block 304, the platform 306, and the actuator 308, respectively, as described above.

As such, the pedal apparatus 400 may include the platform 406 that is configured to secure the footwear block 404. The pedal apparatus 400 may also include the actuator 408 that is configured to apply one or more variable pressures on the footwear block 404 based on one or more movements of the footwear 402 and/or the platform 406. In one example, the footwear 402 includes a system 410 that may detect the one or more movements. In particular, the system 410 may take the form of a wearable device and/or system, e.g., a system-on-chip (SOC), as described herein.

Figure 4B:
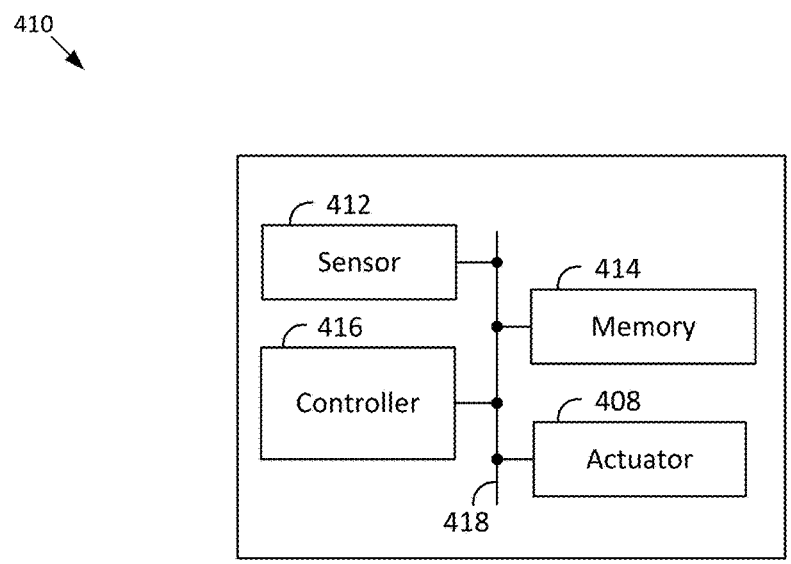
FIG. 4B illustrates an example system.

FIG. 4B illustrates a system 410, according to an exemplary embodiment. In one example, the system 410 may be incorporated with the footwear 400 contemplated above. Yet, in some instances, the system 410 may take the form of a wearable device and/or incorporated with the wearable device, such as a wrist watch device. In one example, the system 410 may include one or more sensors 412, one or more memories 414, one or more controllers and/or processors 416, one or more of the actuators 408, and one or more power supplies, as described herein. In one scenario, the sensor 412, the memory 414, the controller 416, and the actuator 408 may be in communication with a connection, system bus, and/or network 418. In some instances, the sensor 412 may detect one or more movements and the controller 416 may communicate with the actuator 408 over a wireless connection 418 to cause the actuator 408 to apply the one or more variable pressures on the footwear block 404 based on the one or more movements.

In one example, the system 410 includes a non-transitory memory 414 and a controller 416 configured to read instructions from the non-transitory memory 414 to perform operations associated with a mobile structure, e.g., a bicycle. The controller 416 may detect one or more movements of the mobile structure. For example, the controller 416 may receive inputs or data from the sensor 412 that indicates the one or more movements of the mobile structure. As such, the controller 416 may cause the actuator 408 to apply one or more variable pressures on the footwear block 404 based on the one or more movements of the mobile structure.

In one example, the one or more movements of the mobile structure may be detected by a motion sensor 412 associated with the platform 406, where the detected movements may include detected movements of the platform 406. The actuator 408 may be configured to apply the one or more variable pressures to lock the footwear block 404 with the platform 406 based on the one or more movements detected by the motion sensor 412. It should also be noted that the motion sensor 412 may be incorporated and/or embedded in the footwear 402, the footwear block 404, the platform 406, the actuator 408, the crank arm 324, the crank pin 326, the bicycle with the crank arm 324 and/or the crank pin 326, and/or the rider, among other possibilities. In another example, the motion sensor 412 may be located in the frame of the bicycle.

In one example, one or more tilts of the mobile structure, e.g., the bicycle, including the platform 406 may be detected by the motion sensor 412. In particular, the controller 416 may receive inputs or data from the sensor 412 that indicates the one or more tilts and/or movements of the mobile structure. The actuator 408 may be configured to remove the one or more variable pressures from the footwear block 404 based on the one or more tilts and the one or more movements detected by the motion sensor 412. In particular, the controller 416 may transmit signals over the connection 418 to cause the actuator 408 to remove and/or release the one or more variable pressures from the footwear block 404. In one example, the controller 416 may determine the speed and/or the angle of the bicycle and cause the actuator 408 to release the one or more variable pressures from the footwear block 404, such that the rider may place here feet on the ground.

As noted, the controller 416 may receive inputs or data from the sensor 412 that indicates the one or more movements and/or tilts of the mobile structure. In one example, the system 410, e.g., the controller 416, may determine a cadence based on the one or more detected movements associated the platform 408 and/or the one or more detected tilts of the mobile structure. In one example, the sensor 412 may be a cadence sensor 412 configured to determine or detect the cadence to include a pedaling rate, a number of revolutions of the crank arm (e.g., the crank arm 324) over time, such as revolutions or rotations per minute. Further, consider the actuator 408 includes one or more springs, such as the springs 222 and/or 322 described herein. As such, the actuator 408 may be configured to apply the one or more variable pressures on the footwear block 404 based on the cadence of the one or more movements. In one example, consider the bicycle is going up a steep slope and the cadence is fast enough such that the controller 416 determines the rider is not going to fall. In such instances, the springs 222 and/or 322 may increase the one or more variable pressures on the footwear block 404. The one or more variable pressures may make it easier for the rider to bike up the slope using the push/pull technique with the footwear block 404.

Figure 4C:
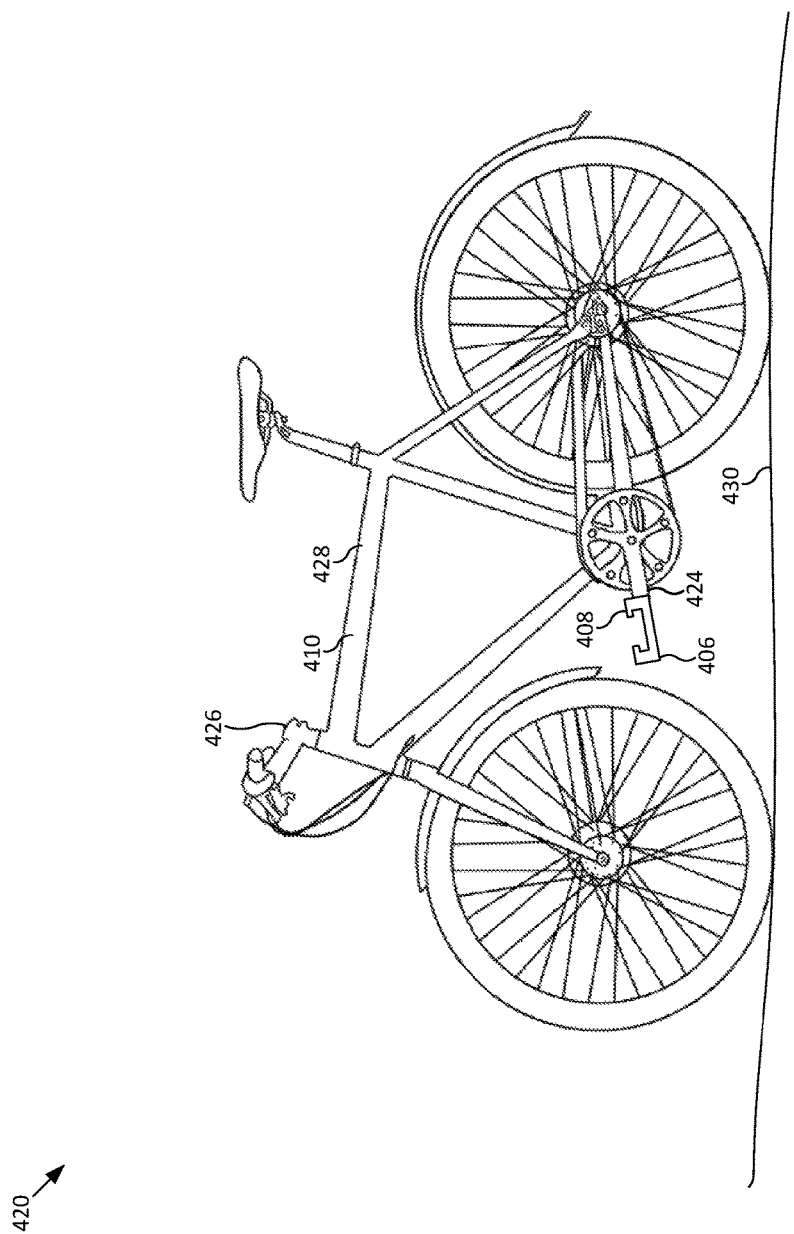
FIG. 4C illustrates an example bicycle system.

FIG. 4C illustrates a bicycle system 420, according to an exemplary embodiment. In one example, the bicycle system 420 may include the platform 406, the actuator 408, the system 410, and a crank arm 424. In some instances, the system 410, including the motion sensor 412, may be located in the bicycle structure 426, where the structure 426 may include the frame 428.

As noted, in one scenario, the actuator 408 may include one or more springs (e.g., the springs 222 and/or 322) configured to apply the one or more variable pressures on the footwear block 404. Further, the controller 416 may determine a slope of the terrain 430 travelled by the mobile structure 426 and a cadence associated with the one or more movements of the footwear block 404, the platform 406, the actuator 408, and/or the crank arm 424. The controller 416 may cause the actuator 408 to increase the one or more variable pressures on the footwear block 404 based on the slope of the terrain 430 and the cadence as described herein. As noted, the bicycle structure 426 may be moving up a steep terrain 430 and the cadence may be fast enough such that the controller 416 determines the rider is not going to fall. In such instances, the springs 222 and/or 322 may increase the one or more variable pressures on the footwear block 404. The one or more variable pressures may make it easier for the rider to bike up the slope using the push/pull technique with the footwear block 404, the platform 406, and the actuator 408.

In one example, the controller 416 may detect a critical point of the mobile structure 426 based on the one or more movements of the mobile structure 426. For instance, the critical point may indicate a predicted stop of the mobile structure 426. In one example, the critical point may indicate a reduction in the cadence measured with the crank arm 424 and a decrease in speed of the mobile structure 426, possibly slowing to a stop. In such instances, the controller 416 may cause the actuator 408 to remove and/or release the one or more variable pressures on the footwear block 404 based on the detected critical point. In particular, the springs 222 and/or 322 may remove the one or more variable pressures on the footwear block 404.

In one example, the controller 416 may predict a fall of the rider based on the one or more movements of the mobile structure 426. In some instances, the controller 416 may cause the actuator 408 to increase the one or more variable pressures on the footwear block 404 based on the predicted fall. For example, if the bicycle structure 426 is moving at one or more particular speeds, the controller 416 may determine that it is safer for the rider to fall with the feet locked to the platforms 406.

Further, as noted, the controller 416 may also determine the slope of the terrain 430 travelled by the mobile structure 426 based on the one or more movements of the mobile structure 426. As such, the actuator 408 may increase the one or more variable pressures on the footwear block 404 based on the slope of the terrain 430. In some instances, it may be safer to fall with the feet locked to the platforms 406 as opposed to the feet being unlocked and possibly moving freely from the mobile structure 426, possibly based on the slope of the terrain 430. In such instances, the springs 222 and/or 322 may increase the one or more variable pressures on the footwear block 404.

Figure 5:
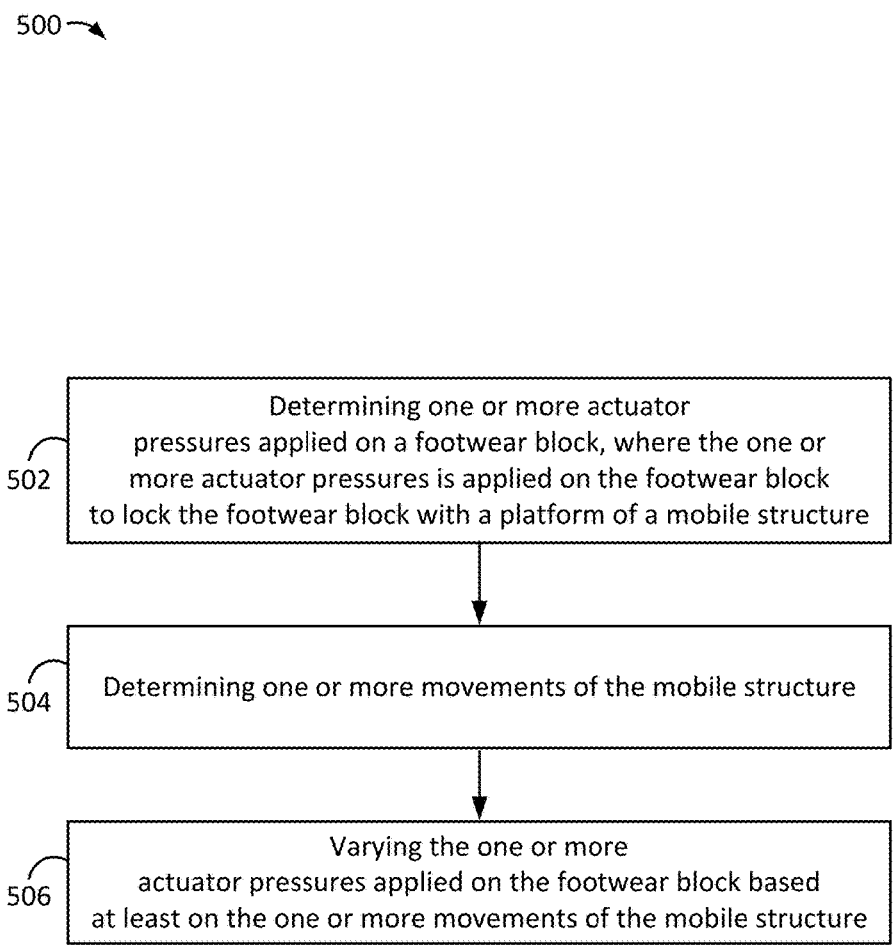
FIG. 5 is a block diagram of an example method for varying one or more actuator pressures.

FIG. 5 a flow chart illustrating a method 500 for varying one or more actuator pressures, according to an exemplary embodiment. In FIG. 5, method 500 is described by way of example as being carried out by a controller, such as the controller 416 described herein. However, it should be understood that exemplary methods, such as method 400, may be carried out by a wearable computer, and/or may be carried out by sub-systems in a wearable computer or in other devices. For example, an exemplary method may alternatively be carried out by a device such as a mobile phone, which is programmed to wirelessly communicate with an actuator and/or determine movements of a mobile structure. Other examples are also possible.

As shown by block 502, the method 500 includes determining one or more actuator pressures applied on a footwear block, where the one or more actuator pressures is applied on the footwear block to lock the footwear block with a platform of a mobile structure. As noted, the controller 416 may determine one or more actuator pressures applied on the footwear block 404, where the one or more actuator pressures is applied on the footwear block 404 to lock the footwear block 404 with the platform 406 of the mobile structure 426.

As shown by block 504, the method 500 includes determining one or more movements of the mobile structure. As noted, the controller 416 may determine one or more movements of the mobile structure 426, footwear block 404, the platform 406 and/or the actuator 408, the crank arm 424, and/or the frame 428, among other possibilities.

As shown by block 506, the method 500 includes varying the one or more actuator pressures applied on the footwear block based at least on the one or more movements of the mobile structure. As noted, the controller 416 may vary the one or more actuator pressures applied on the footwear block 404 based at least on the one or more movements of the mobile structure 426.

In one example, the one or more varied actuator pressures includes a reduced pressure that enables the footwear block 404 to be released from the platform 406 with a resistance from the reduced pressure. For example, the rider may have to twist or pull her leg in one or more directions to release the footwear block 404 from the platform 406.

Figure 6:
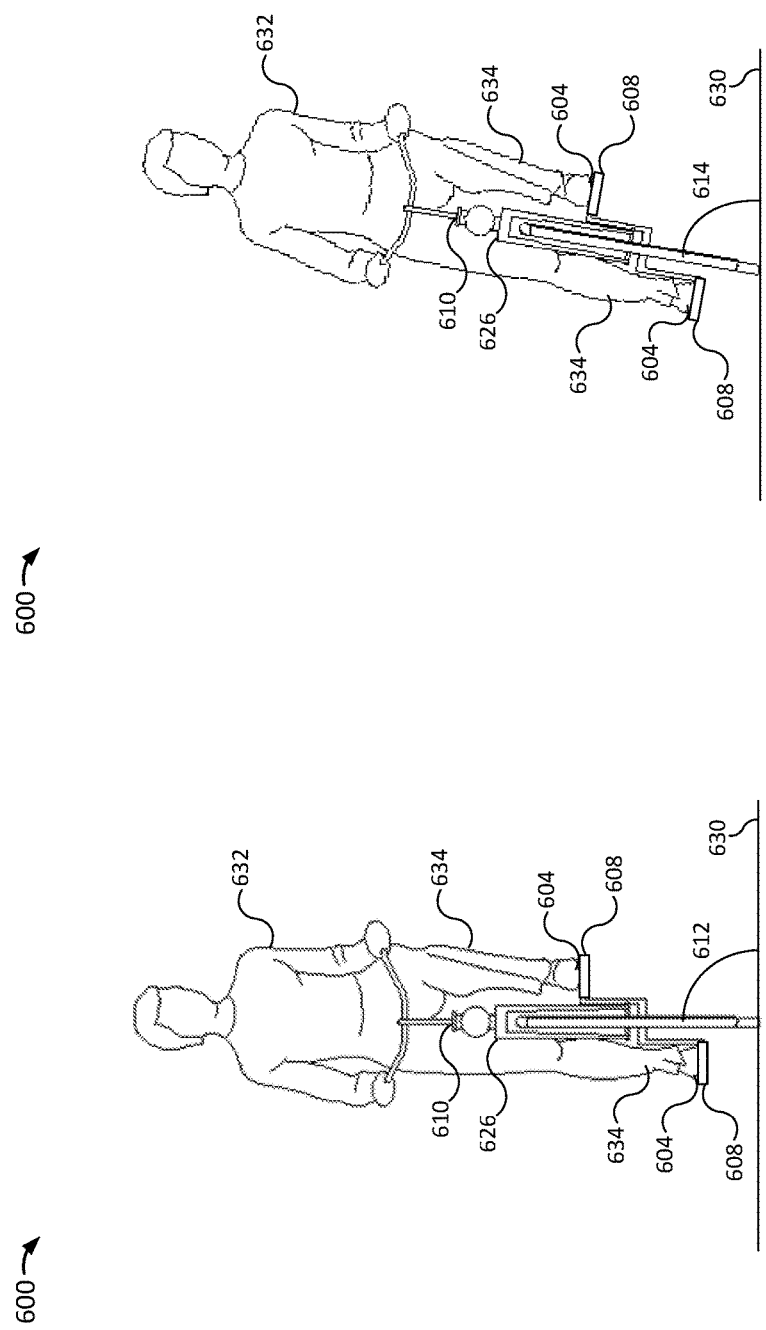
FIGS. 6A and 6B illustrate another example system.

FIGS. 6A and 6B illustrate an example system 600, according to an exemplary embodiment. In one example, the system 600 includes the footwear blocks 604, the actuators 608, the system 610, and the mobile structure 626 that may take the form of the footwear blocks 104, 204, 304, and/or 404, the actuators 108, 208, 308, and/or 408, the system 410, and the mobile structure 426, respectively.

In one example, the system 610 may include the controller 416. As such, the system 610 and/or the controller 416 may detect a critical point of the mobile structure 626 based on the one or more movements of the mobile structure 626. For instance, the critical point may indicate an angle 612 and/or 614 of the mobile structure 626 with respect to the terrain 630. In such instances, the controller 416 may cause the actuator 608 to increase or decrease the one or more variable pressures on the footwear block 604 based on the detected critical point. In particular, the springs (e.g., springs 222 and/or 322) of the actuator 608 may increase or decrease the one or more variable pressures on the footwear block 604.

In one example, the system 610 and/or the controller 416 may determine one or more tilts of the mobile structure 626, possibly associated with the angles 612 and/or 614. For example, the sensor 412 may include a gyroscope and/or a tilt sensor configured to detect the one or more tilts. As such, the controller 416 may receive inputs and/or data from the sensor 412 to detect the one or more tilts. As such, the system 610 and/or the controller 416 may vary the one or more actuator pressures based on the one or more tilts of the mobile structure 626. In another example, referring back to the method 500, the one or more actuator pressures may be varied based on the one or more tilts of the mobile structure 626.

In one example, the one or more movements of the mobile structure 626 may indicate an increase in speed of the mobile structure 626. As such, the one or more varied actuator pressures may include an increased actuator pressure to lock the footwear block 604 with the actuator 608 based on the increase in speed. Further, as noted, the controller 416 may also determine the slope of the terrain 630 travelled by the mobile structure 626 based on the one or more movements of the mobile structure 626. As such, the actuator 608 may increase the one or more variable pressures on the footwear block 604 based on the slope of the terrain 630. In some instances, it may be safer to fall with the legs 634 locked with the actuators 608, possibly based on the slope of the terrain 630. In such instances, the springs (e.g., the springs 222 and/or 322) of the actuator 608 may increase the one or more variable pressures on the footwear block 604.

In one example, the system 610 and/or the controller 416 may determine a safe fall procedure associated with the mobile structure 626 based on the one or more movements of the mobile structure 626. As noted, the bicycle structure 626 may be moving at one or more particular speeds based on the slope of the terrain 630. As such, the system 610 and/or the controller 416 may determine that it is safer for the rider 632 to fall with the legs 634 locked by the actuators 608 as opposed to the legs 634 being unlocked and moving freely from the mobile structure 626. In such instances, the one or more actuator pressures may be varied based on the safe fall procedure. It should be noted that various safe fall procedures and/or events may be stored in a memory of the system 610 that may take the form of the memory 414 described herein.

Figure 7:
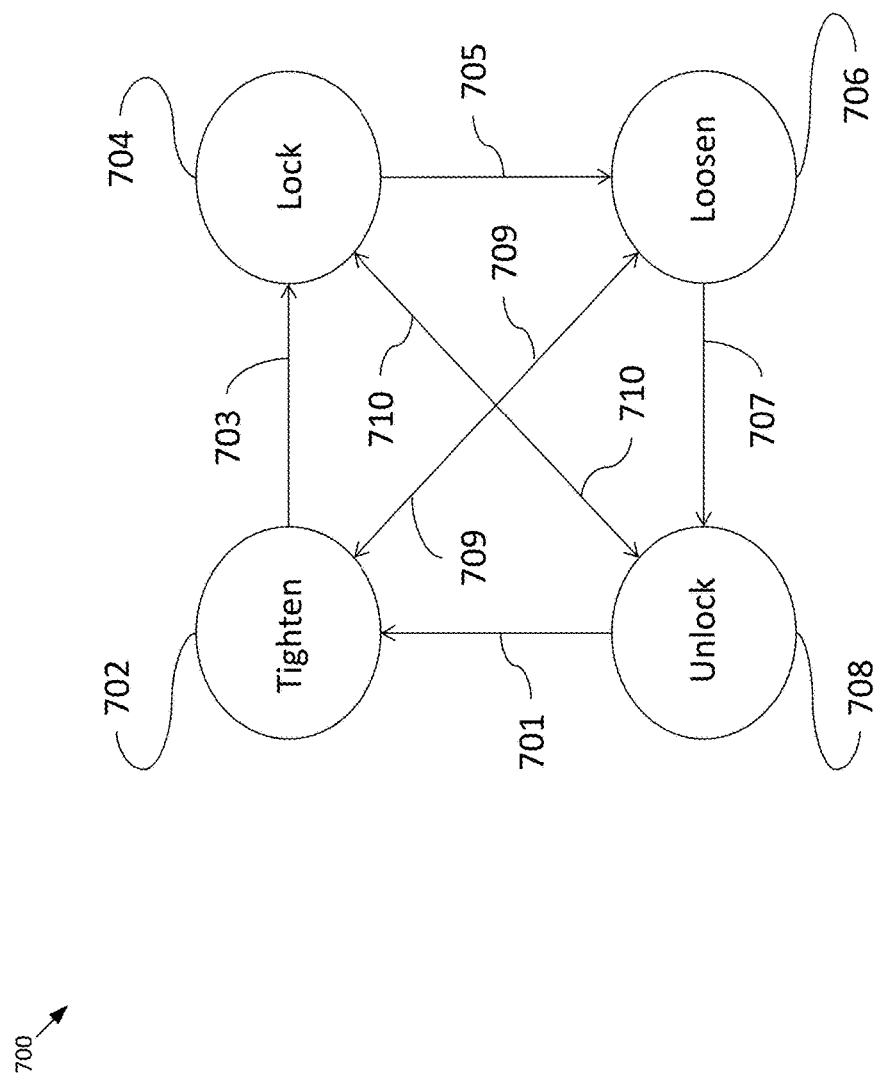
FIG. 7 is an example stage diagram.

FIG. 7 is a state diagram 700, according to an exemplary embodiment. For example, the stage diagram 700 provides various states 702, 704, 706, and 708 associated with varying one or more actuator pressures. In FIG. 7, a controller, such as the controller 416, may be programmed with the various states 702-708 to control the actuators 108, 208, 308, 408, and 608 described herein. Further, a wearable computer and/or sub-systems in a wearable computer or other types of mobile devices, such as a mobile phone, may also be programmed with the various states 702-708 to control the actuators 108, 208, 308, 408, and 608.

As shown by state 702, the diagram 700 includes various states associate with varying actuator pressures applied on a footwear block, according to an exemplary embodiment. As described herein, the controller 416 may determine one or more actuator pressures to be applied on the footwear block 604 based on the movement of footwear block 604, the mobile structure 626, and the slope of the terrain 630.

As shown, the diagram 700 illustrates various actuator states 702, 704, 706, and 708. Further, the diagram 700 includes various state changes 701, 703, 705, 707, 709, and 710 for transitioning between the various states 702, 704, 706, and 708. For example, controller 416 may send signals to actuator 408 to transition to a tighten state 702. Further, the tighten state 702 could be achieved by transitioning from an unlock state 708 via the state change 701 and/or by transitioning from a loosen state 706 as demonstrated by the change 709. As a further example, a lock state 704 could be achieved by transitioning from the tighten state 702 via the change 703 and/or by transitioning from an unlock state 708 as demonstrated by the change 710, among various other possibilities.

In one aspect, a pedal apparatus according to an exemplary embodiment is provided. The pedal apparatus may include a platform configured to secure a footwear block. The pedal apparatus may also include at least one actuator configured to apply one or more variable pressures on the footwear block based at least on one or more movements of the platform.

In another aspect, the pedal apparatus may include a platform with means for securing a footwear block. The pedal apparatus may also include at least one actuator with means for applying one or more variable pressures on the footwear block based at least on one or more movements of the platform.

In another aspect, a system according to an exemplary embodiment is provided. The system may include a non-transitory memory. Further, the system may include at least one controller or processor configured to read instructions from the non-transitory memory to perform operations. The operations may include detecting one or more movements of a mobile structure. The operations may also include causing at least one actuator to apply one or more variable pressures on a footwear block based at least on the one or more movements of the mobile structure.

In another aspect, a system according to an exemplary embodiment is provided. The system may include a non-transitory memory. Further, the system may include at least one controller or processor with means for reading instructions from the non-transitory memory to perform operations. The system may include means for detecting one or more movements of a mobile structure. The system may include means for causing at least one actuator to apply one or more variable pressures on a footwear block based at least on the one or more movements of the mobile structure.

In another aspect, a method is provided, according to an exemplary embodiment. The method includes determining one or more actuator pressures applied on a footwear block, where the one or more actuator pressures is applied on the footwear block to lock the footwear block with a platform of a mobile structure. The method also includes determining one or more movements of the mobile structure. The method also includes varying the one or more actuator pressures applied on the footwear block based at least on the one or more movements of the mobile structure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A pedal apparatus comprising:
 a platform configured to secure a block, wherein the block is attached to a footwear, and wherein the platform is different than the block; and
 at least one actuator comprising one or more springs to apply one or more variable pressures on the block based at least on one or more movements of the platform by:
  applying an increase in pressure on the block when an increase in speed is detected from the one or more movements; and
  applying a decrease in pressure on the block when a decrease in speed is detected from the one or more movements; and
 wherein the one or more movements is detected by a computer associated with the pedal.

2. The pedal apparatus of claim 1,
 wherein the block comprises a front portion and a back portion,
 wherein the front portion fits under a clamp of the first portion such that the clamp secures the block to the platform to a first degree, and
 wherein the at least one actuator is configured to apply, based on the one or more movements of the platform, the one or more variable pressures on the back portion of the block to secure the block to the platform to a second degree.

3. The pedal apparatus of claim 2, wherein the second degree comprises a degree that allows the block and the platform to lock.

4. The pedal apparatus of claim 2,
 wherein the front portion of the block comprises a front groove positioned under the clamp of the platform,
 wherein the back portion of the block comprises a back groove positioned under the at least one actuator, and wherein the at least one actuator is further configured to apply the one or more variable pressures on the back groove to cause the front groove to secure to the clamp to a third degree.

5. The pedal apparatus of claim 1,
wherein the at least one actuator comprises the one or more springs configured to apply the one or more variable pressures to the block thereby causing the block to secure with the platform to a first degree,
wherein the block comprises one or more curvatures on a back portion of the block, and
   wherein the block is configured to release from the platform based on at least one of the one or more curvatures or the one or more springs.

6. The pedal apparatus of claim 1,
wherein the one or more springs are configured to apply the one or more variable pressures on the block in a manner that secures the block with the platform, and wherein the one or more springs is further configured to alter the one or more variable pressures from the footwear block based on one or more tilts and the one or more movements of the platform.

7. The pedal apparatus of claim 1,
wherein the at least one actuator comprises the one or more springs configured to apply the one or more variable pressures on the block based on the cadence of the one or more movements.

8. The pedal apparatus of claim 7, wherein a computer causes the one or more variable pressures to change based on the one or more movements of the platform and the cadence of the one or more movements.

9. A system for applying pressures to a petal apparatus comprising:
a petal apparatus comprising a platform configured to secure a block, wherein the block is attached to a footwear, and wherein the platform is different than the block; at least one actuator to apply one or more variable pressures on the block based at least on one or more movements of the platform; at least one computer processor; and
at least one memory containing instructions which, when executed, cause the at least one computer processor to:
   detect the one or more movements of the platform; and
   based on the one or more movements, cause application of the one or more variable pressures on the block by:
      applying an increase in pressure on the block when an increase in speed is detected from the one or more movements; and
      applying a decrease in pressure on the block when a decrease in speed is detected from the one or more movements.

10. The system of claim 9,
wherein the block comprises a front portion and a back portion,
wherein the platform fits under a clamp of the first portion such that the clamp secures the block to the platform to a first degree, and
wherein the at least one processor is configured to cause application of, based on the one or more movements of the platform, the one or more variable pressures on the back portion of the block to secure the block to the platform to a second degree.

11. The system of claim 10, wherein the second degree comprises a degree that allows the block and the platform to lock.

12. The system of claim 10,
wherein the front portion of the block comprises a front groove positioned under the clamp of the platform,
wherein the back portion of the block comprises a back groove positioned under the at least one actuator, and
wherein the at least one actuator is further configured to apply the one or more variable pressures on the back groove to cause the front groove to secure to the clamp to a third degree.

13. The system of claim 9, wherein the at least one processor causes the one or more variable pressures to change based on the one or more movements of the platform and a cadence of the one or more movements.

14. The system of claim 9, wherein the at least one processor and the memory is embedded in the footwear.

* * * * *